US012266853B2

(12) United States Patent
Tang et al.

(10) Patent No.: US 12,266,853 B2
(45) Date of Patent: Apr. 1, 2025

(54) INTEGRATED STRUCTURE OF DIFFERENTIAL DIELECTRIC RESONATOR ANTENNA AND INDEPENDENTLY CONTROLLABLE DUAL-BAND FILTER

(71) Applicant: NANTONG UNIVERSITY, Jiangsu (CN)

(72) Inventors: Hui Tang, Jiangsu (CN); Cheng Shao, Jiangsu (CN); Jie Ge, Jiangsu (CN); Qingyuan Lu, Jiangsu (CN); Jianxin Chen, Jiangsu (CN)

(73) Assignee: NANTONG UNIVERSITY, Nantong (CN)

( * ) Notice: Subject to any disclaimer, the term of this patent is extended or adjusted under 35 U.S.C. 154(b) by 160 days.

(21) Appl. No.: 18/035,931

(22) PCT Filed: Nov. 30, 2021

(86) PCT No.: PCT/CN2021/134307
§ 371 (c)(1),
(2) Date: May 9, 2023

(87) PCT Pub. No.: WO2022/142962
PCT Pub. Date: Jul. 7, 2022

(65) Prior Publication Data

US 2023/0420835 A1 Dec. 28, 2023

(30) Foreign Application Priority Data

Dec. 29, 2020 (CN) ......................... 202011591320.0

(51) Int. Cl.
*H01Q 1/50* (2006.01)
*H01P 1/20* (2006.01)
*H01Q 9/04* (2006.01)

(52) U.S. Cl.
CPC ................. *H01Q 1/50* (2013.01); *H01P 1/20* (2013.01); *H01Q 9/0485* (2013.01)

(58) Field of Classification Search
CPC .......... H01Q 1/50; H01Q 9/0485; H01P 1/20; H01P 1/20381; H01P 7/10
See application file for complete search history.

(56) References Cited

FOREIGN PATENT DOCUMENTS

CN 109193147 B * 9/2020 ............... H01Q 1/38
CN 111786116 A * 10/2020 ............... H01Q 1/36
(Continued)

OTHER PUBLICATIONS

Hui Tang et al., Differential Dual-Polarized Filtering Dielectric Resonator Antenna, IEEE Transactions on Antennas and Propagation, Aug. 2018, pp. 4298-4302, vol. 6, No. 8.

*Primary Examiner* — Hoang V Nguyen

(57) ABSTRACT

Disclosed is an integrated structure of a differential dielectric resonator antenna and a separately controllable dual-band filter. The integrated structure includes a dielectric substrate, a rectangular dielectric resonator and a feed structure. Two functions, i.e., an antenna function and a filter function, which do not interfere with each other, are realized at the same time. Differential excitation is performed on a main mode of the rectangular dielectric resonator, so as to design a differential dielectric resonator antenna. A separately controllable first passband of the filter is integrated and realized on a virtual ground of the differential dielectric resonator antenna, and then a separately controllable second passband of the filter is realized by using a reflection ground. The antenna and the filter share the same module, but maintain good isolation, such that the number and volume of microwave devices in a radio frequency system can be reduced.

5 Claims, 6 Drawing Sheets

(56) References Cited

FOREIGN PATENT DOCUMENTS

| | | | | | |
|---|---|---|---|---|---|
| CN | 111799549 | A | * | 10/2020 | ............... H01Q 1/36 |
| CN | 111834739 | A | * | 10/2020 | .............. H01P 7/105 |

* cited by examiner

INTEGRATED STRUCTURE OF DIFFERENTIAL DIELECTRIC RESONATOR ANTENNA AND INDEPENDENTLY CONTROLLABLE DUAL-BAND FILTER

TECHNICAL FIELD

The present disclosure relates generally to a wireless communication technical field, and particularly relates to an integrated structure of differential dielectric resonator antenna and independently controllable dual-band filter.

BACKGROUND

Differential dielectric resonator antenna employs two feeding ports to directly input differential signals, and is widely used in modern communication systems. As balanced circuits can greatly reduce crosstalk, RF front-end circuits tend to use differential technology. Differential feeding technology refers to the simultaneous feeding of two ports with a pair of differential signals having the same amplitude and opposite phases. Opposite to the differential signals, the common-mode signals, which are a pair of signals with the same amplitude and phase, are always from external noise interference. The single-ended antenna cannot be directly connected to differential communication units. Instead, a BALUN (Balance-unbalance) transformer should be introduced to convert the differential signal into a single-ended signal. The introduction of BALUN transformer, on the one hand, reduces the system integration, on the other hand, brings unnecessary loss to the system and reduces the system efficiency. The differential antenna solves these problems very well by using a pair of differential feeding ports to directly input differential signals, which eliminates the requirement of BALUN transformer, reduces the loss to a certain extent for the system, and also provides a higher integration level for the RF front-end. In addition, differential antennas also have a series of advantages, including common-mode signal inhibition ability, high isolation, relatively low cross-polarization, and the like. Dielectric resonators are widely used in the design of antennas and filters due to their low loss, high Q value, and volume reusability. The application of dielectric resonators is one of the research hotspots in high-performance wireless communication systems.

So far, there are no researches on the integrated design of filters based on differential dielectric resonator antennas. In fact, in addition to reflective ground, differential dielectric resonator antennas also have another kind of ground, called virtual ground, due to their differential feeding characteristics, and both grounds can be used simultaneously for multi-functional designs.

SUMMARY

The present disclosure has provided an integrated structure of differential dielectric resonator antenna and independently controllable dual-band filter, which better satisfies the miniaturization requirements of modern communications.

According to a first aspect, an integrated structure of differential dielectric resonator antenna and independently controllable dual-band filter, is provided, which includes: a dielectric substrate; a top metal layer, which is arranged at the upper surface of the dielectric substrate; a first bottom metal strip, a second bottom metal strip and a third bottom metal strip, which are arranged at the lower surface of the dielectric substrate; a metal through-hole, which connects the first bottom metal strip and the top metal layer; a rectangular dielectric resonator; a first metal strip which is arranged at a first directional symmetry plane of the rectangular dielectric resonator; a second metal strip and a third metal strip which are arranged at a side wall of the rectangular dielectric resonator; a first metal column which connects the second bottom metal strip and the second metal strip; and a second metal column which connects the third bottom metal strip and the third metal strip; wherein the second bottom metal strip, the second metal strip and the first metal column are symmetrically arranged relative to the first directional symmetry plane of the rectangular dielectric resonator; the third bottom metal strip, the third metal strip, the second metal column and the first metal strip are symmetrically arranged relative to a second directional symmetry plane of the rectangular dielectric resonator.

Preferably, in an embodiment of the integrated structure of differential dielectric resonator antenna and independently controllable dual-band filter, according to the present disclosure, the first directional symmetry plane of the rectangular dielectric resonator is a differential feeding virtual ground; the first metal strip is a resonator structure which constitutes a first passband of the independently controllable dual-band filter; the top metal layer is a reflective ground of the dielectric resonator antenna; and the first bottom metal strip is a resonator structure which constitutes the second passband of the independently controllable dual-band filter.

Preferably, in an embodiment of the integrated structure of differential dielectric resonator antenna and independently controllable dual-band filter, according to the present disclosure, the first metal strip and the first bottom metal strip are bendable structures.

Preferably, in an embodiment of the integrated structure of differential dielectric resonator antenna and independently controllable dual-band filter, according to the present disclosure, the first metal strip and the first bottom metal strip form a step impedance resonator through different width combinations.

Preferably, in an embodiment of the integrated structure of differential dielectric resonator antenna and independently controllable dual-band filter, according to the present disclosure, the first metal strip and the first bottom metal strip are either a quarter-wavelength resonator with a short circuit at one end or a half-wavelength resonator.

Preferably, in an embodiment of the integrated structure of differential dielectric resonator antenna and independently controllable dual-band filter, according to the present disclosure, the top metal layer is provided with a first through-hole corresponding to the first metal column and a second through-hole corresponding to the second metal column.

Preferably, in an embodiment of the integrated structure of differential dielectric resonator antenna and independently controllable dual-band filter, according to the present disclosure, the second bottom metal strip serves as an antenna feed line, and the third bottom metal strip serves as a filter feed line.

Preferably, in an embodiment of the integrated structure of differential dielectric resonator antenna and independently controllable dual-band filter, according to the present disclosure, the third bottom metal strip is provided with two open-circuit branches to provide a transmission zero of the independently controllable dual-band filter.

Compared to the prior art, embodiments of the integrated structure of differential dielectric resonator antenna and independently controllable dual-band filter, according to the present disclosure, propose for the first time to use the virtual ground of the differential antenna to integrate and design a filter. In addition, a microstrip filter function can be further obtained using the reflective ground, thereby providing another independently controllable passband for the filter. This design has the characteristics of multi-function, small size, low loss, etc.

BRIEF DESCRIPTION OF THE DRAWINGS

The present disclosure is further explained in conjunction with the accompanying drawings.

REFERENCE NUMBERS

1. Dielectric substrate; 11. First bottom metal strip; 12. Second bottom metal strip; 13. Third bottom metal strip; 131. Open-circuit branch; 132. Fourth bottom metal strip; 14. Top metal layer; 141. First through-hole; 142. Second through-hole; 2. Rectangular dielectric resonator; 21. First metal strip; 22. Second metal strip; 23. Third metal strip; 212. Fourth metal strip; 3. Metal through-hole; 4. First metal column; 5. Second metal column.

DETAILED DESCRIPTION OF THE PREFERRED EMBODIMENT

The present disclosure is further explained in conjunction with the accompanying drawings and following embodiments.

In order to make the technical features, objectives, and effects of the present disclosure better understood, specific embodiments of the present disclosure are described in detail with reference to the accompanying drawings.

Figure 1:
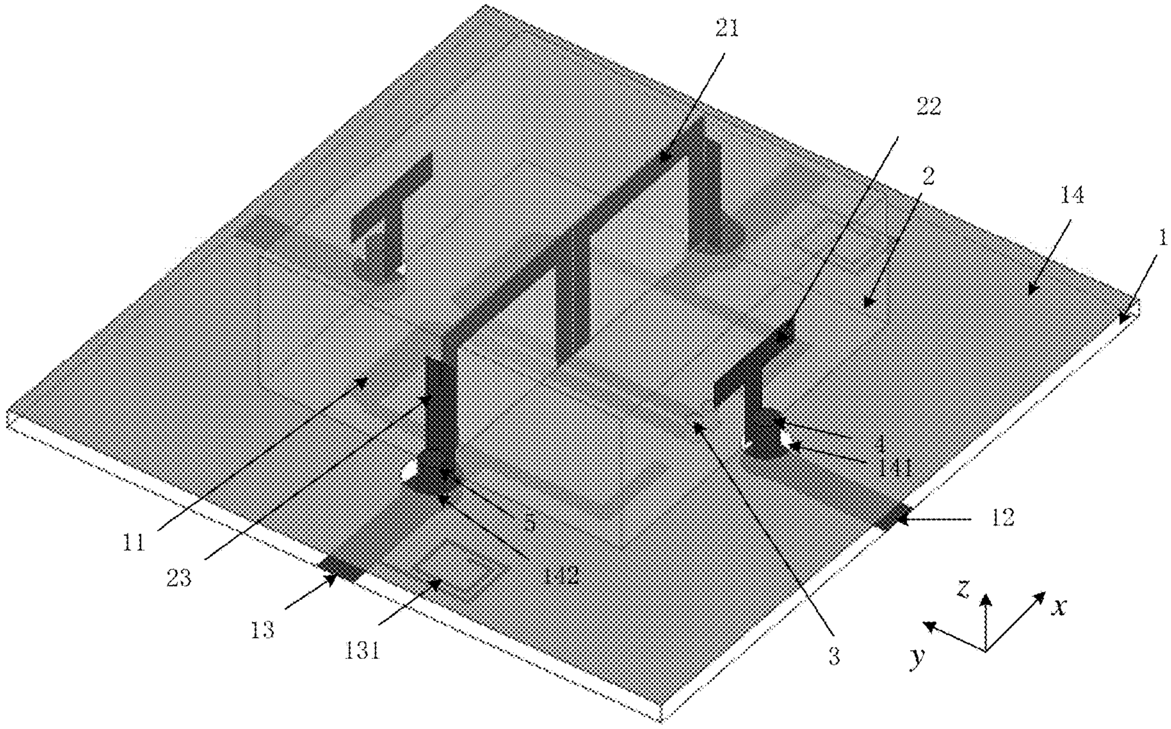
FIG. 1 is a perspective view of an integrated structure of differential dielectric resonator antenna and independently controllable dual-band filter, according to the present disclosure.
Figure 2:
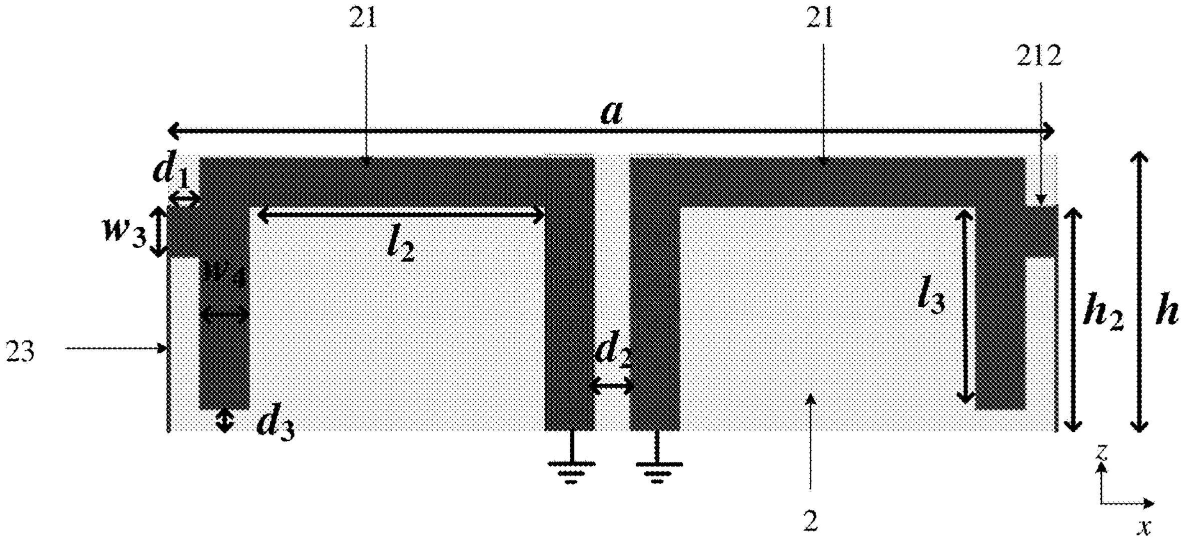
FIG. 2 is a structural diagram illustrating an implementation of the first passband of the independently controllable dual-band filter in an embodiment of the present disclosure.
Figure 3:
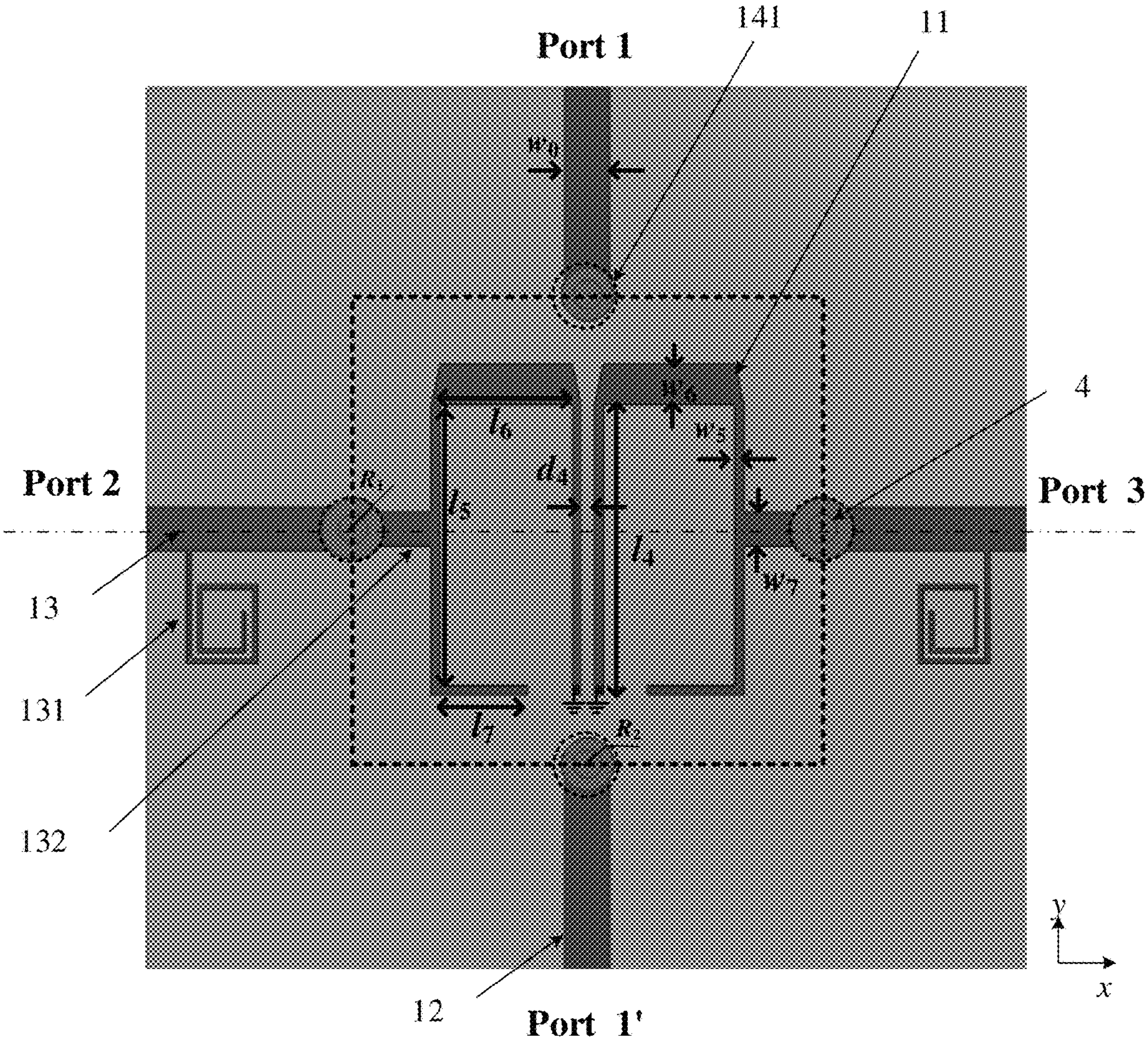
FIG. 3 is a structural diagram illustrating an implementation of the second passband of the independently controllable dual-band filter in an embodiment of the present disclosure.

Referring to FIGS. 1, 2, and 3, the integrated structure of differential dielectric resonator antenna and independently controllable dual-band filter in an embodiment of the present disclosure, is disclosed. As shown, a rectangular dielectric resonator 2 has a dimension of a*a*h, a relative dielectric constant of 38 and a tangent loss angle of $1.5*10^{-4}$. In order to fully utilize its first directional symmetry plane (virtual ground of main-mode $TE_{11\delta}$), the rectangular dielectric resonator 2 consists of two parts of the same size, and is pasted by glue ($\varepsilon_{rg}$=9.5, with a thickness of 0.03 mm) and installed at a reflective ground of a dielectric substrate 1. The dielectric substrate 1 is square and has a thickness of $h_0$, and its model is Rogers 4003C (with a relative dielectric constant of 3.55 and a tangent loss angle of 0.0027).

Taking the embodiment of the present disclosure as an example, the integrated structure of differential dielectric resonator antenna and independently controllable dual-band filter is divided into two parts, namely, the antenna part and the filter part, for specific explanation according to FIGS. 1 to 3.

Antenna Part

Figure 4:
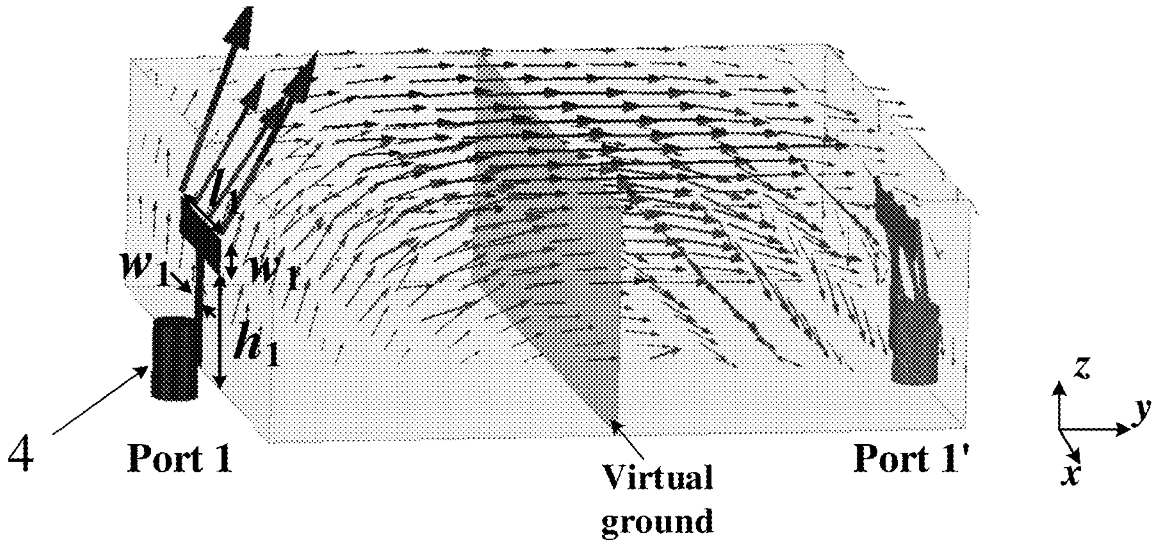
FIG. 4 is a distribution diagram of a main-mode electric field of the dielectric resonator of the present disclosure.

Ports 1-1' are the differential ports of the differential antenna in the embodiment of the present disclosure, and are corresponding to the second bottom metal strip 12 which is arranged at the lower surface of the dielectric substrate 1. The ports 1-1' are connected with the second metal strip 22 at a side wall of the rectangular dielectric resonator 2 through the first metal column 4 which passes through a first through-hole 141 which is etched at the top metal layer 14. Wherein the top metal layer 14 is located at the upper surface of the dielectric substrate 1. The second bottom metal strip 12 is a pair of 50Ω microstrip lines with a width of $W_0$. The pair of 50Ω microstrip lines are symmetrically arranged at the first directional symmetry plane (xoz plane) of the rectangular dielectric resonator 2. The second metal strip 22 is a pair of T-shaped metal strips with dimensions of $w_1$, $l_1$ and $h_1$1. The pair of T-shaped metal strips are symmetrically arranged at both sides of the rectangular dielectric resonator 2 and parallel to the first directional symmetry plane. The ports 1-1' are configured to excite the dominant mode $TE_{11\delta}$ in the rectangular dielectric resonator. The electric field distribution of this mode is shown in FIG. 4, which shows typical characteristics of the differential mode. The electric field near the first directional symmetry plane is perpendicular to the plane, and the first directional symmetry plane can be referred to as the virtual ground of the working mode. Compared to the single-ended mode, the common-mode signals are suppressed by the virtual ground, thus providing better noise suppression capability and less cross-polarization for the differential antenna in the embodiment of the present disclosure. Any circuit at the first directional symmetry plane never affects the electric field distribution in the working mode, thus achieving independence of antenna performance.

Filter Part

The virtual ground of the differential antenna of the embodiment of the present disclosure is used to design a bandpass filter. FIG. 2 shows a structure of the first passband of the filter which is designed at the virtual ground of the first directional symmetry plane. FIG. 3 shows a structural diagram of the second passband of the filter. A third bottom metal strip 13, a third metal strip 23, a second metal column 5, and a first metal strip 21 are symmetrically disposed relative to a second directional symmetry plane (yoz plane) of the rectangular dielectric resonator 2. Ports 2 and 3 shown in FIG. 3 are arranged at both sides of an edge of the dielectric substrate 1 along the first directional symmetry plane, and are corresponding to the third bottom metal strip 13 which is arranged at the lower surface of the dielectric substrate 1, as input and output ports of the filter. The ports 2 and 3 are connected with the third metal strip 23 which is arranged at the side wall of the rectangular dielectric resonator 2 through a second metal column 5 which passes through a second through-hole 142 at the top metal layer 14. Wherein the top metal layer 14 is located at the upper surface of the dielectric substrate 1. The first metal strip 21, which is arranged at the xoz plane of the first directional symmetry plane of the rectangular dielectric resonator 2, is formed by two U-shaped bent strip resonators which are coupled together. The two U-shaped bent strip resonators have a width of $w_4$ and a quarter wavelength, and their coupling coefficient is controlled by a distance $d_2$. The end of each strip resonator is connected to the reflective ground for short circuit. Each strip resonator is directly fed by another fourth metal strip 212 which has a length of dl and a width of w3 and connects to the third metal strip 23. The third metal strip 23 has a length of h2 and a width of w2 and is arranged at the side wall of the rectangular dielectric resonator 2. This structure is a differential virtual ground circuit structure which achieves the first passband of a dual-band filter.

FIG. 3 shows a structure of the second passband of the filter which is designed at a bottom surface of the dielectric substrate 1. Input and output ports of the filter are connected with the first bottom metal strip 11 through a third bottom metal strip 13 (50Ω microstrip line), and then through a small section of the fourth bottom metal strip 132 with a width of w7 after passing through with a radius of R1. The first bottom metal strip 11, the third bottom metal strip 13, the fourth bottom metal strip 132 and the pads, are arranged at lower surface of the dielectric substrate 1. The first bottom metal strip 11 is a pair of mutually coupled quarter-wavelength bent resonators which are shorted through the third metal column 3 at adjacent ends. This resonator combines different widths $w_5$ and $w_6$ to form a step impedance resonator to facilitate the coupling coefficient adjustment and the impedance matching of the input and output ports. This part of the structure is a microstrip circuit structure that uses the reflective ground of the differential antenna as the ground to achieve the second passband of the dual-band filter.

In order to introduce a transmission zero between the passbands of the filter, two open-circuit branches 131 are added to the third bottom metal strip 13 at the feeding end of the dual passband filter.

The circuits of the first and second passbands of the dual-band filter function in the embodiment of the present disclosure are reflectively isolated, so that the two passbands can be independently controlled. Because the first passband of the filter is designed at the virtual ground, and there is a natural isolation of the reflective ground between the second passband and the antenna, the filter function and antenna function never affect each other and can work independently.

Figure 5:
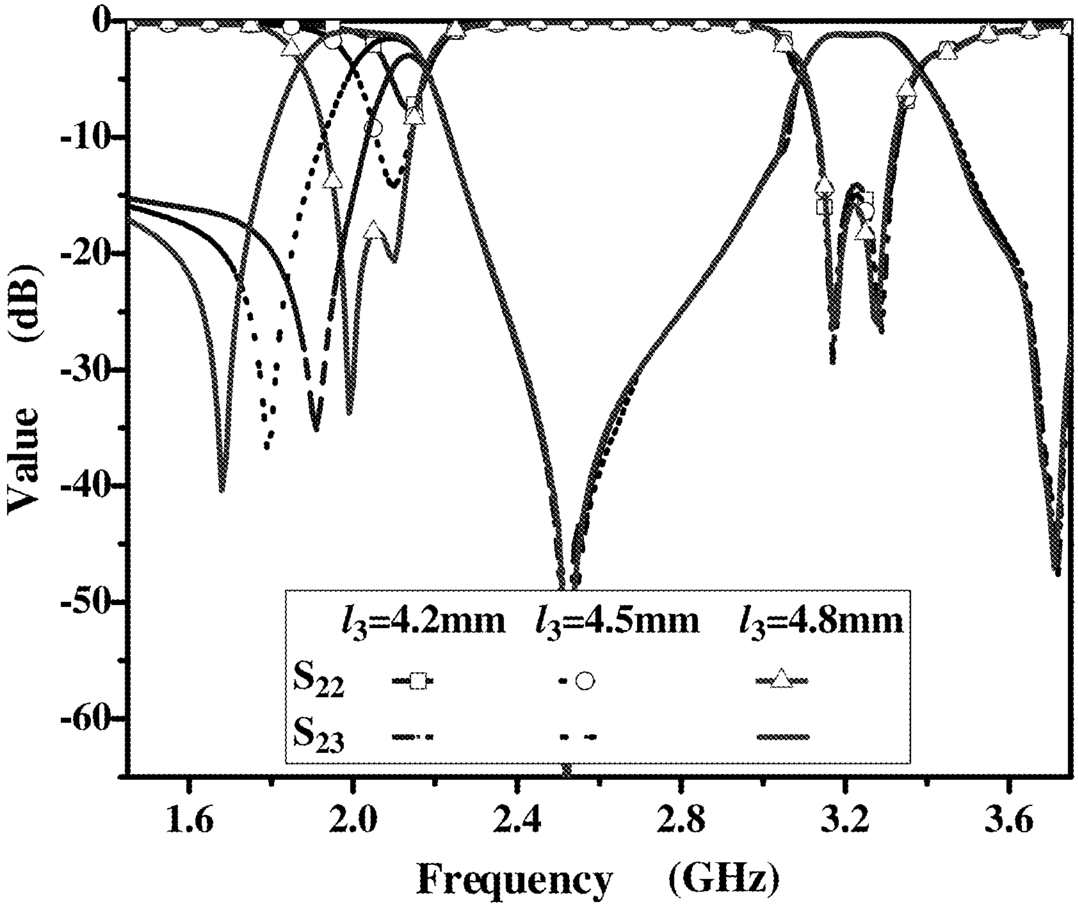
FIG. 5 is a comparison diagram for simulated and measured S-parameters and realized gain of the integrated structure of differential dielectric resonator antenna and independently controllable dual-band filter, according to the present disclosure.
Figure 6:
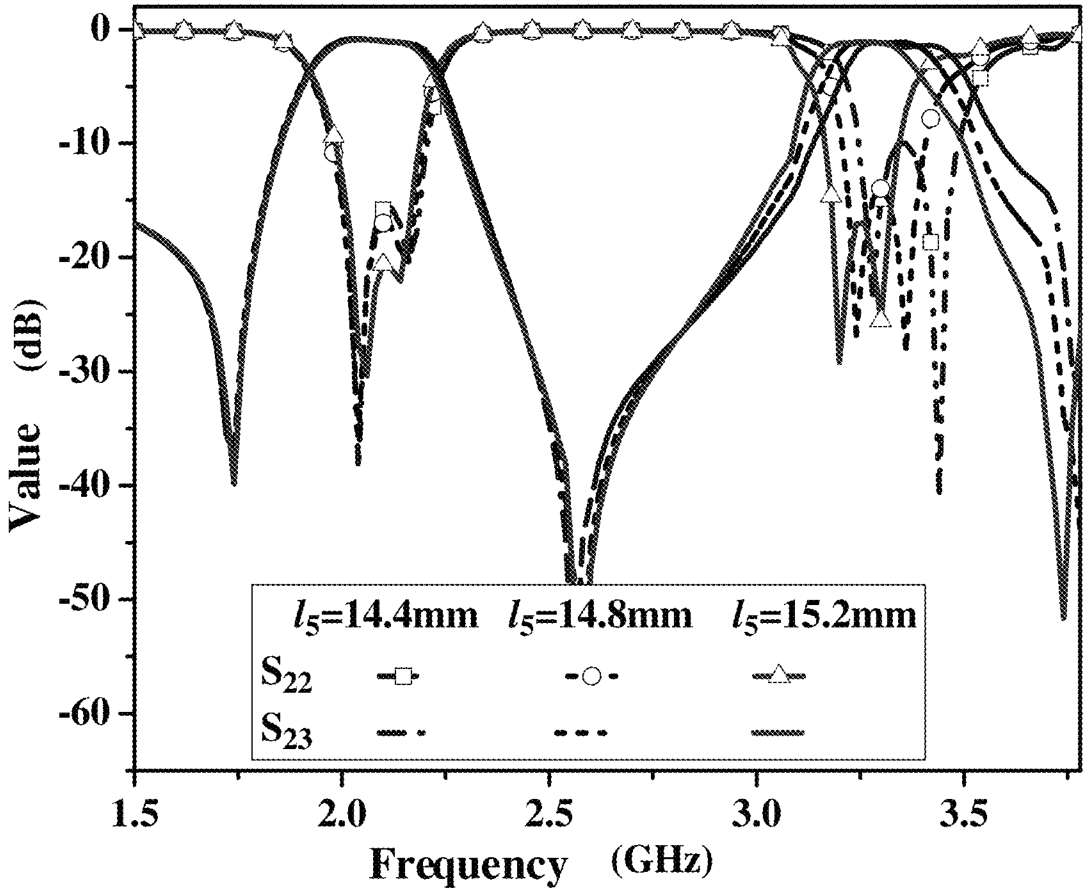
FIG. 6 is a diagram illustrating variations of the center frequency of the first passband of the dual-band filter with 13, in the integrated structure of differential dielectric resonator antenna and independently controllable dual-band filter, in an embodiment of the present disclosure.

In order to clearly illustrate the partially independently controllable characteristics of the filter in the integrated structure of differential dielectric resonator antenna and independently controllable dual-band filter, according to the embodiment of the present disclosure, following parameter analysis is implemented. Wherein when one parameter changes, the other parameters remain unchanged. FIGS. 5 and 6 show the variation of the center frequency of the passband of the filter simulation relative to different parameter sizes. As shown in FIG. 5, as $l_3$ increases from 4.2 mm to 4.8 mm, the length of the resonator at the virtual ground increases, the center frequency of the first passband of the filter gradually decreases, while the center frequency of the second passband remains unchanged. In FIG. 6, when $l_5$ increases from 14.4 mm to 15.2 mm, the length of the microstrip resonator based on the reflective ground increases, and the center frequency of the second passband decreases, while the center frequency of the first passband remains unchanged. Based on the above discussion, it is concluded that the central frequencies of the two passbands of the filter can be independently controlled, which greatly improves the freedom degree of the design. Referring FIGS. 5 and 6, it can be seen that there is always a transmission zero at the edge of each frequency band. The transmission zero between the first and second passbands is brought by the open-circuit branch 131 of ¼ wavelength. All transmission zeros improve the selectivity of the filter.

The embodiment of the present disclosure optimizes dimension of each part, and the specific parameters are shown in the table below:

| Dimension | a | h | $h_0$ | $h_1$ | $h_2$ | $w_0$ | $w_1$ | $w_2$ | $w_3$ | $w_4$ | $w_5$ | $w_6$ | $w_7$ | l |
|---|---|---|---|---|---|---|---|---|---|---|---|---|---|---|
| Value (mm) | 20 | 6.2 | 0.813 | 3 | 5 | 1.8 | 1 | 1.2 | 1.1 | 1.1 | 0.8 | 1.8 | 1.7 | 50 |
| Dimension | $l_1$ | $l_2$ | $l_3$ | $l_4$ | $l_5$ | $l_6$ | $l_7$ | $d_1$ | $d_2$ | $d_3$ | $d_4$ | $R_1$ | $R_2$ | |
| Value (mm) | 5.5 | 7.5 | 4.8 | 13.2 | 12.4 | 6 | 4 | 0.2 | 0.2 | 0.2 | 0.2 | 1.4 | 1.2 | |

Figure 7:
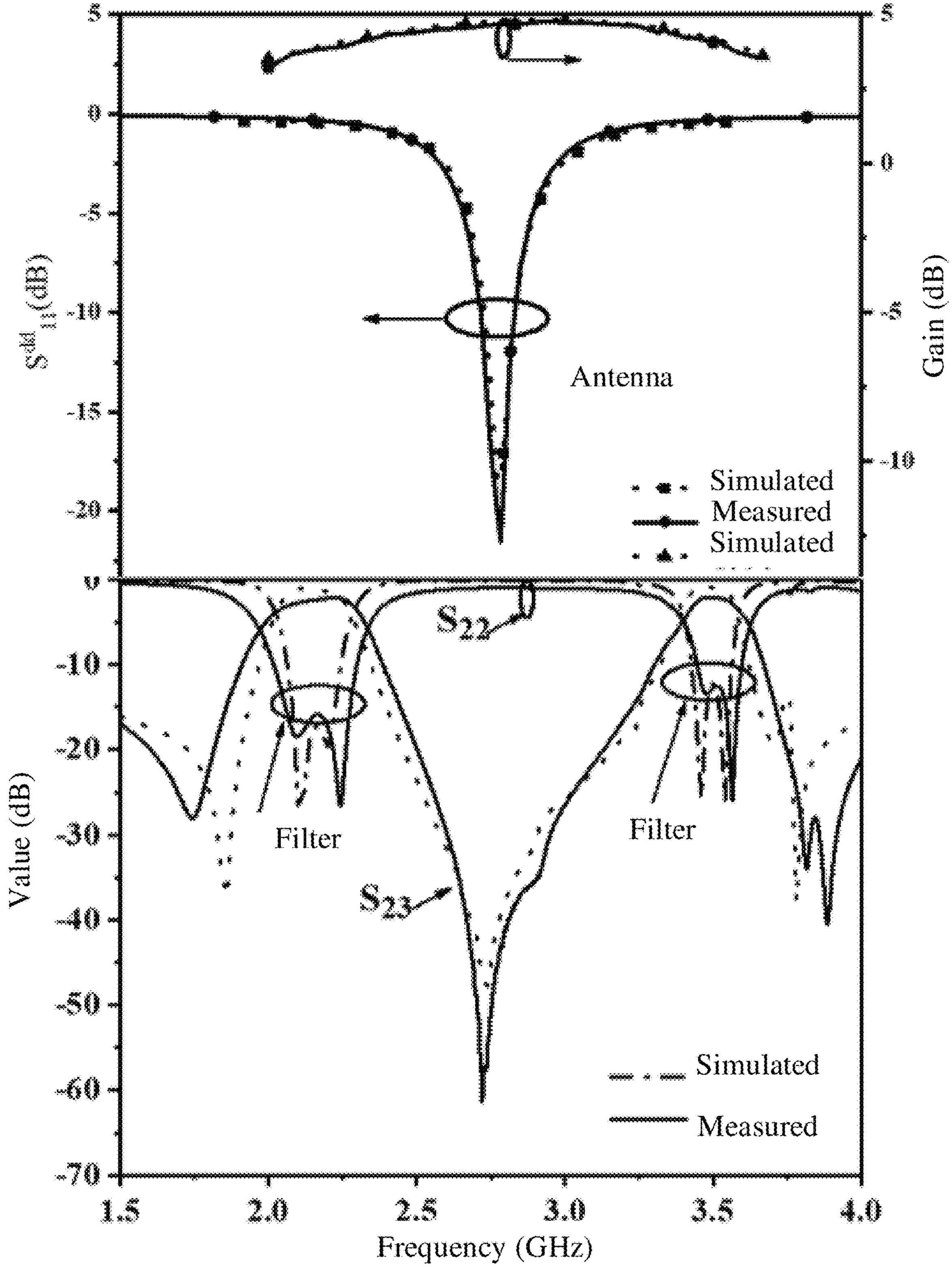
FIG. 7 is a diagram illustrating variations of a center frequency of the first passband with 15, of the integrated structure of differential dielectric resonator antenna and independently controllable dual-band filter, in an embodiment of the present disclosure.
Figure 8:
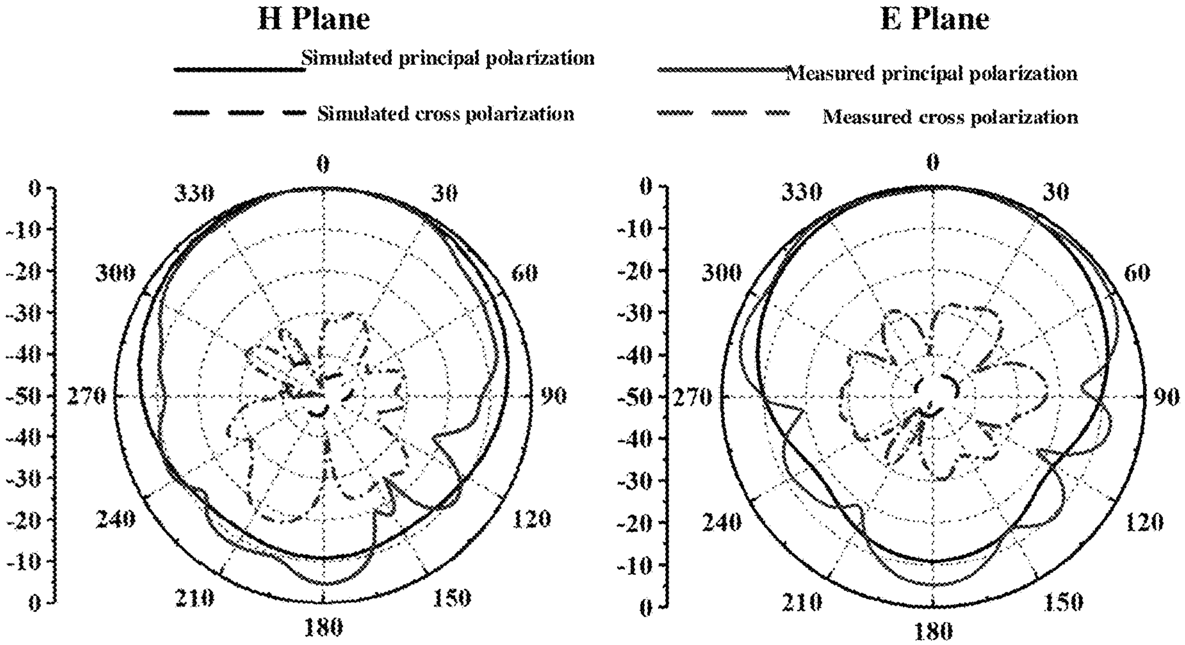
FIG. 8 is a comparison diagram for simulated radiation patterns and measured radiation patterns on E-plane and H-plane at a frequency of 2.54 GHz, of the integrated structure of differential dielectric resonator antenna and independently controllable dual-band filter, according to the present disclosure.

Software HFSS, Agilent E5230C network analyzer, and microwave anechoic chamber, are employed to simulate and measure the integrated structure of differential dielectric resonator antenna and independently controllable dual-band filter in the present disclosure. As shown in FIG. 7, the differential antenna in the embodiment of the present disclosure operates at 2.54 GHz, with simulated and measured 10 dB bandwidths of 2.7%. The simulated maximum gain reaches 4.5 dBi, and the measured gain is 4.3 dBi, as shown in FIG. 7. The simulated and measured radiation patterns of the differential antenna in the embodiment of the present disclosure are shown in FIG. 8. Due to the differential feeding, the simulated and measured cross-polarizations of the antenna are lower than −60 dB and −38 dB, respectively. The decrease in the measured cross-polarization inhibition level is mainly due to the slight imbalance of the BALUN transformer and the asymmetry caused by the glue, which are used in the measurement.

Referring to FIG. 7, the simulated first passband in the filter function of the embodiment of the present disclosure is located at about 2.1 GHz with a bandwidth of 13%, while the measured first passband is located at 2.05 GHz with a bandwidth of 13.6%. The simulated center frequency of the second passband is 3.3 GHz with a bandwidth of 7.2%, while the measured center frequency of the second passband is 3.3 GHz with a bandwidth of 7.3%. The simulated and measured return losses of both passbands are greater than 25 dB. The simulated and measured insertion losses for the first passband are 0.9 dB and 1.6 dB, respectively, and the simulated and measured insertion losses for the second passband are 1.0 dB and 1.55 dB, respectively. The measured insertion loss includes the losses of SMA connectors and feeders used in the experiment. The measured insertion loss is still acceptable because each SMA connector introduces an insertion loss greater than 0.15 dB over the entire frequency range, and errors occur due to equipment assembly.

The simulated and measured results of the integrated structure of differential dielectric resonator antenna and independently controllable dual-band filter in the embodiment of the present disclosure, have achieved good consistency.

The embodiments of the present disclosure have been described above in conjunction with the accompanying drawings, but the present disclosure is not limited to the specific embodiments described above. The specific embodiments described above are only illustrative, not limiting. With the inspiration of the present disclosure, ordinary technical personnel in the art can also make many forms without departing from the scope protected by the purpose and claims of this disclose, all of which fall within the protection of the present disclosure.

In addition to the above embodiments, there may be other embodiments of the present disclosure. All technical solutions formed by equivalent replacement or equivalent transformation are within the protection scope required by the present disclosure.

The invention claimed is:

1. An integrated structure of differential dielectric resonator antenna and independently controllable dual-band filter, comprising: a dielectric substrate and a rectangular dielectric resonator; wherein a first directional symmetry plane of the rectangular dielectric resonator is a differential feeding virtual ground;

a top metal layer is arranged at an upper surface of the dielectric substrate, wherein the top metal layer is a reflective ground of the differential dielectric resonator antenna;

a first bottom metal strip, two second bottom metal strips and two third bottom metal strips, are arranged at a lower surface of the dielectric substrate; wherein the first metal strip is an ¼ wavelength resonator structure which constitutes a second passband of the independently controllable dual-band filter, the second bottom metal strip serves as an independent antenna feed line, and the third bottom metal strip serves as an independent filter feed line; wherein the first bottom metal strip and the top metal layer are connected with each other through a metal through-hole;

two first metal strips are arranged at the first directional symmetry plane of the rectangular dielectric resonator; the first metal strip is a resonator structure which constitutes a first passband of the independently controllable dual-band filter; wherein the first metal strip and the first bottom metal strip are parallel to each other;

a second metal strip and a first metal column which connects the second bottom metal strip and the second metal strip, are arranged at a position of a side wall of the rectangular dielectric resonator, wherein said position of the side wall is corresponding to the second bottom metal strip, the first metal column and the second metal strip excite a working mode of the rectangular dielectric resonator;

a third metal strip and a second metal column which connects the third bottom metal strip and the third metal strip, are arranged at a position of the side wall of the rectangular dielectric resonator, wherein said position of the side wall is corresponding to the third bottom metal strip; wherein the third metal strip and the second metal column transmit energy to the first metal strip;

wherein two second bottom metal strips, two second metal strips, and two first metal columns are symmetrically arranged relative to the first directional symmetry plane of the rectangular dielectric resonator; two third bottom metal strips, two third metal strips, two second metal columns and two first metal strips are symmetrically arranged relative to a second directional symmetry plane of the rectangular dielectric resonator.

2. The integrated structure of differential dielectric resonator antenna and independently controllable dual-band filter according to claim 1, wherein the first metal strip and the first bottom metal strip are bendable structures.

3. The integrated structure of differential dielectric resonator antenna and independently controllable dual-band filter according to claim 1, wherein the first metal strip and the first bottom metal strip form a step impedance resonator through different width combinations.

4. The integrated structure of differential dielectric resonator antenna and independently controllable dual-band filter according to claim 1, wherein the first metal strip is either an ¼ wavelength resonator with a short circuit at one end or an ½ wavelength resonator.

5. The integrated structure of differential dielectric resonator antenna and independently controllable dual-band filter according to claim 1, wherein the top metal layer is provided with a first through-hole corresponding to the first metal column and a second through-hole corresponding to the second metal column.

* * * * *